US006934365B2

United States Patent
Suganuma et al.

(10) Patent No.: US 6,934,365 B2
(45) Date of Patent: Aug. 23, 2005

(54) EMERGENCY CALL DEVICE AND METHOD FOR CONTROLLING EMERGENCY CALL

(75) Inventors: Hisayuki Suganuma, Hamamatsu (JP); Yasuhiro Kawawaki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/701,933

(22) Filed: Nov. 5, 2003

(65) Prior Publication Data

US 2004/0091085 A1 May 13, 2004

(30) Foreign Application Priority Data

Nov. 6, 2002 (JP) ........................................ 2002-322739

(51) Int. Cl.⁷ .............................................. H04M 11/04
(52) U.S. Cl. .......................................... 379/45; 379/37
(58) Field of Search ..................................... 379/37–51

(56) References Cited

U.S. PATENT DOCUMENTS 4,064,368 A * 12/1977 Dibner ......................... 379/38
5,673,304 A * 9/1997 Connor et al. ................. 379/45
2002/0136362 A1 * 9/2002 Stumer et al. ................. 379/45

FOREIGN PATENT DOCUMENTS

JP 2001-093065 4/2001
JP 2001-354091 12/2001

* cited by examiner

*Primary Examiner*—Wing Chan
(74) *Attorney, Agent, or Firm*—Harness, Dickey & Pierce, PLC

(57) ABSTRACT

An emergency call device has an emergency call-sending button and a disconnection button. The emergency call device carries out an emergency call to a service center when an emergency condition occurs. The emergency call device can terminate the emergency call in response to a disconnection request from the disconnection button only after a connection request signal, a user ID, and a current location data of the vehicle are transmitted to the service center. As a result, the service center can recognize the occurrence of the emergency call even when the disconnection is requested before originating the emergency call.

8 Claims, 5 Drawing Sheets

EMERGENCY CALL DEVICE AND METHOD FOR CONTROLLING EMERGENCY CALL

CROSS REFERENCE TO RELATED APPLICATIONS

This application is based on Japanese Patent Application No. 2002-322739 filed on Nov. 6, 2002, the contents of which are incorporated herein by reference.

BACKGROUND OF THE INVENTION

1. Field of the Invention

The present invention relates to an emergency call device and a method for controlling an emergency call that is used in a vehicle.

2. Description of Related Art

An emergency call device for a vehicle is proposed and developed. The emergency call device for the vehicle is used for carrying out an emergency call to a predetermined emergency service center by wireless when an emergency situation occurs. The emergency call is carried out based on an input from an occupant of the vehicle and a detection of an emergency situation detecting apparatus. The emergency situation includes a traffic accident, a theft of the vehicle, a robbery, or the like.

In such an emergency call device of the vehicle, the emergency call is prevented from being disconnected by an operation of the emergency call device so that a third person, such as a thief and a robber, cannot prevent the emergency call. However, this may also prevent the emergency call device from terminating the emergency call even when the emergency call is carried out by an operating error by a normal user of the vehicle.

JP-A-2001-93065 and JP-A-2001-354091 disclose another emergency call device. The emergency call device has a disconnection button for disconnecting the emergency call, which is carried out by the operating error of the user.

However, if the emergency call device has the disconnection button, the thief and the robber may terminate the emergency call immediately after the emergency call is carried out by the operation of an injured party (user). In such a situation, an occurrence of the emergency call itself is not notified to the service center at all. This prevents an original purpose of the emergency call.

SUMMARY OF THE INVENTION

In view of the foregoing situation, it is an object of the present invention to provide an emergency call device that can notify a call destination of an occurrence of an emergency call even when a termination of the emergency call is requested by an operation of a person.

According to one aspect of the present invention, the emergency call device has call means, determination means, and termination means. The call means carries out an emergency call to a certain call destination when an emergency condition occurs. The determination means determines whether a termination of the emergency call is requested. The termination means terminates an emergency call based on the determination of the determination means after recognizable data is provided in the certain call destination. The certain call destination can recognize an occurrence of the emergency call based on the recognizable data.

In such an emergency call device, the emergency call is terminated after the recognizable data is provided in the certain call destination. In other words, the termination means prevents the emergency call from being terminated before the recognizable data is provided to the call destination. As a result, the call destination can recognize the occurrence of the emergency call even when the termination of the emergency call is requested by an operation of a person.

According to another aspect of the present invention, the termination of the emergency call is delayed until the recognizable data is transmitted to the call destination. Accordingly, the emergency call is terminated after the recognizable data is transmitted to the call destination. As a result, the call destination can recognize the occurrence of the emergency call even when the termination of the emergency call is requested by the operation of the person.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
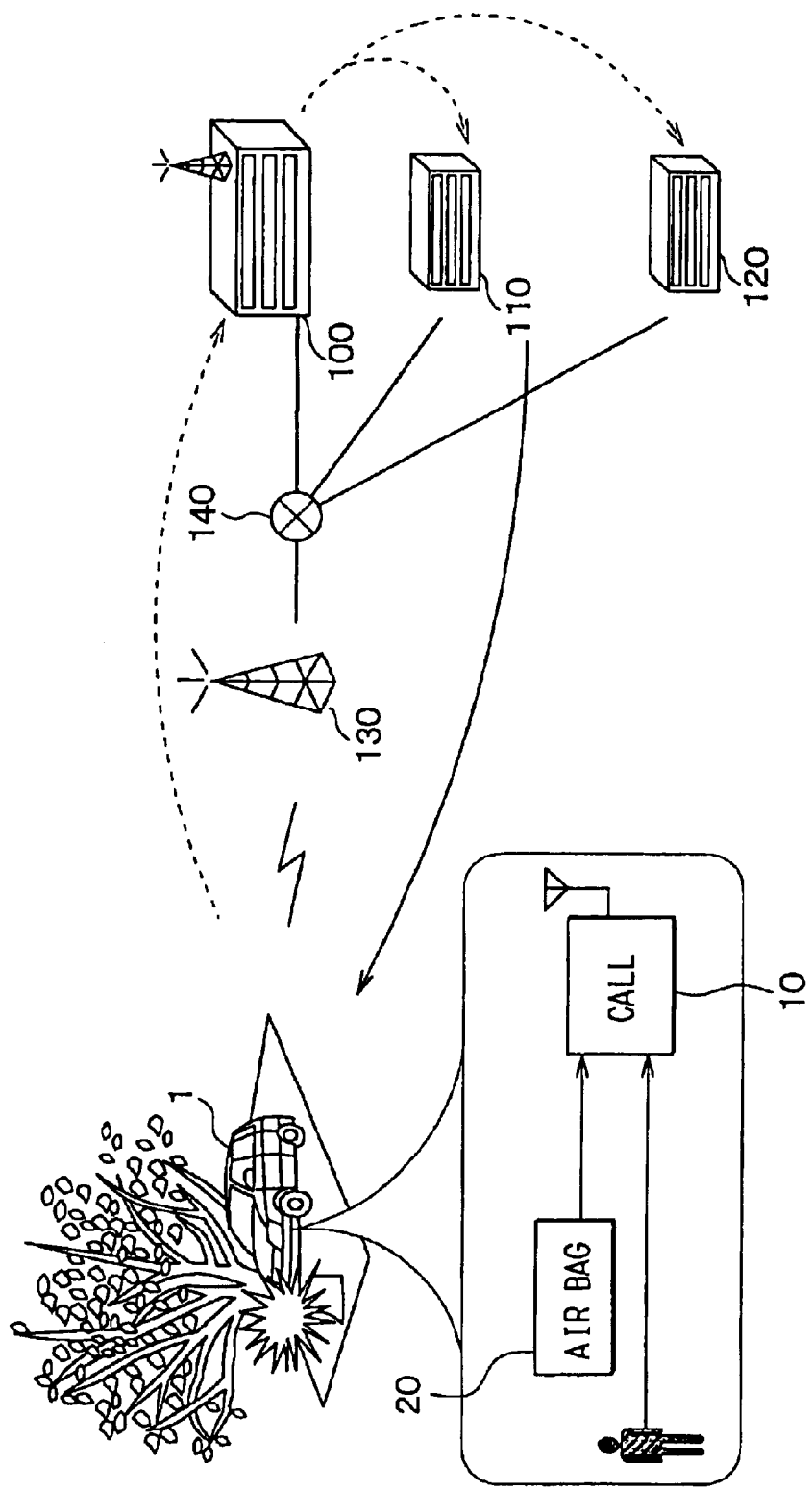
FIG. 1 is a block diagram of an emergency call system according to a first embodiment of the present invention.

The preferred embodiments of the present invention will be explained with reference to the accompanying drawings. In the drawing, the same numerals are used for the same components and devices.

[First Embodiment]

An emergency call system is shown in FIG. 1. The emergency call system has an emergency call device 10, a service center 100, a base station 130, and a communication network 140. The service center 100 is connected to a public institution 110, such as a police station and a fire station, and a home of a user of the emergency call device 10 via the communication network 140.

The emergency call device 10 is provided in a vehicle 1, and it carries out an emergency call when an emergency situation occurs. The service center 100 is a predetermined emergency call destination. The base station 130 is used for wireless communication.

When the emergency call device 10 receives an instruction to carry out the emergency call by an operation of an occupant of the vehicle 1 or by an air bag 20 due to an emergency situation, the emergency call device 10 carries out the emergency call to the service center 100 by wireless. The emergency situation is a case that the vehicle 1 meets with a traffic accident or an occupant in the vehicle 1 is robbed or the like. Then, the occupant communicates with an operator of the service center 100 via the base station 130 and the communication network with respect to the emergency call.

The service center 100 performs a relay service of the emergency call under the service center 100 has a contract with a carrier and the occupant (user) of the vehicle. When the service center 100 receives the emergency call, the operator of the service center 100 orders the police station and/or the fire station 110 via the communication network 140. The operator also notifies a home 120 of the emergency situation via the communication network 140. The service center 100 simultaneously performs voice communication and data communication. In the data communication, the service center 100 transmits various data to the emergency call device 10, and receives the various data from the emergency call device 10.

Figure 2:
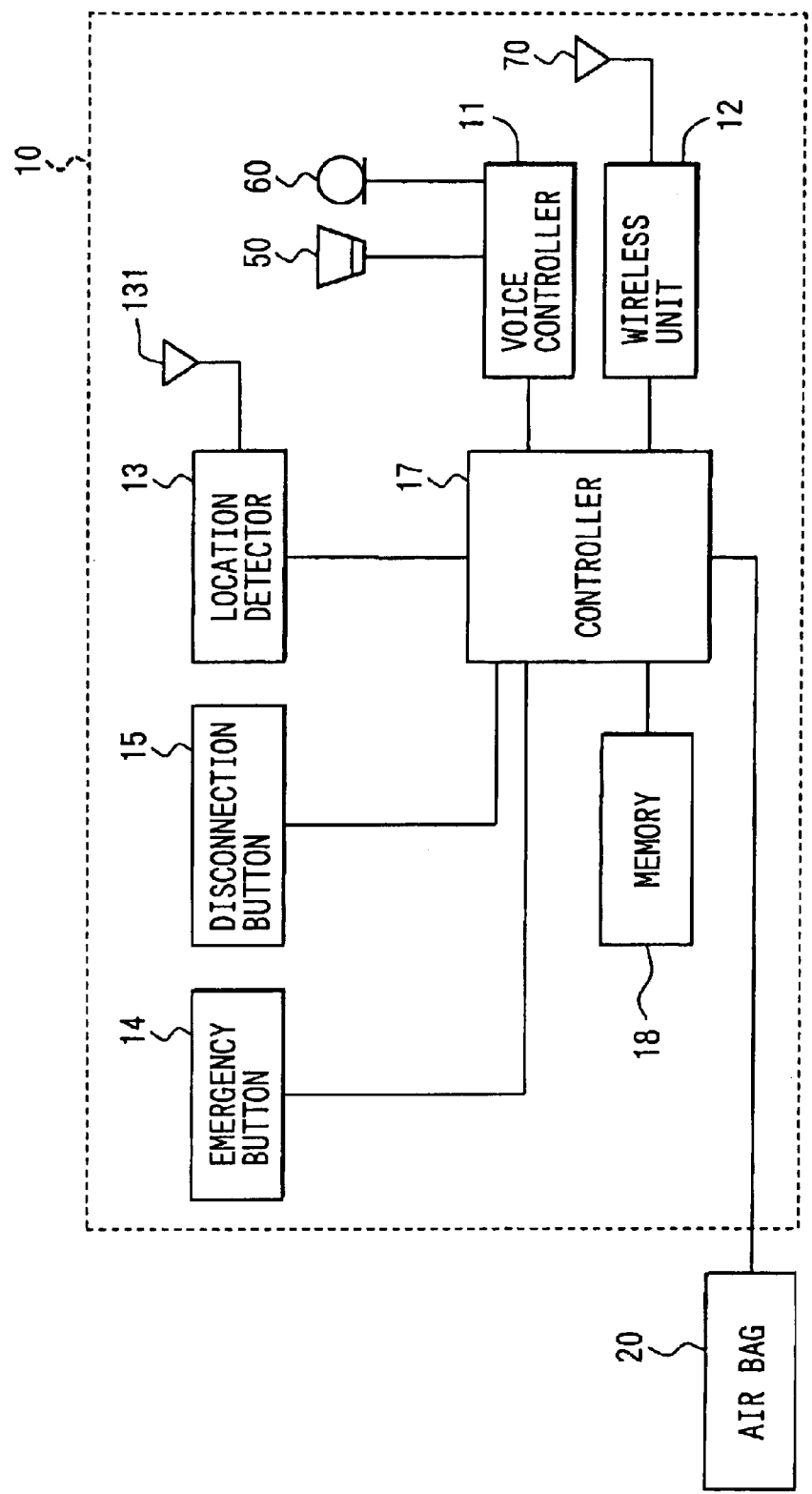
FIG. 2 is a block diagram showing an emergency call device that is used in the emergency call system according to the first embodiment.

As shown in FIG. 2, the emergency call device 10 has a voice processor 11, a wireless unit 12, a vehicle location detector 13, an emergency call-sending button 14, an emergency call disconnection button 15, a controller 17, a memory 18, a speaker 50, a microphone 60, and an antenna 70.

The wireless unit 12 receives a downlink signal from the base station 130 via the antenna 70, and outputs the reception signal to the controller 17. The downlink signal includes a voice signal and a data signal. On the other hand, the wireless unit 12 receives a transmission signal from the controller 17, and modulates the transmission signal to produce an uplink signal. The wireless unit 12 also transmits the uplink signal via the antenna 70.

The voice processor 11 receives a voice signal from the controller 17. The voice signal is a part of the reception signal. The voice processor 11 converts the voice signal to an analog signal with a digital-to-analog conversion. Then, the voice processor 11 controls the speaker 50 to output a reception voice signal corresponding to the analog signal.

The microphone 60 receives an analog voice signal from the occupant, and outputs the analog voice signal to the voice processor 11. The voice processor 11 receives the analog voice signal from the microphone 60. Then, the voice processor 11 converts the analog voice signal to a digital signal with an analog-to-digital conversion, so that the voice processor 11 produces a digital voice signal. The voice processor 11 outputs the digital voice signal to the controller 17.

The vehicle location detector 13 has a GPS receiver to obtain current location data of the vehicle 1. The GPS receiver periodically obtains the current location data of the vehicle 1 in accordance with GPS signals received from GPS satellites via a GPS antenna 131. The GPS receiver outputs the current location data to the controller 17. The GPS receiver may send the current location data in response to a request from the controller 17, or it may obtain the current location data to send it to the controller 17 in response to the request from the controller 17.

The emergency call-sending button 14 outputs a predetermined emergency signal to the controller 17 when the emergency call-sending button 14 is pressed by the occupant due to the emergency situation that the occupant is robbed or the like.

The emergency call disconnection button 15 outputs a predetermined disconnection signal to the controller 17 when the emergency call disconnection button 15 is pressed by the occupant because the occupant wants to terminate the emergency call. The disconnection signal is used as a termination signal for terminating the emergency call and disconnecting a communication link between the emergency call device 10 and the service center 100.

The memory 18 has a RAM and a ROM. The ROM stores a control program, an identification data of a sender that is the emergency call device 10, etc. The control program is used for controlling the controller 17. The identification data of the sender is a user ID, such as a telephone number, and so on.

The controller 17 has a microcomputer and a digital signal processor (not shown). The microcomputer reads the control program stored in the memory 18, and carries out a process based on the control program, so that the controller 17 can carry out the emergency call to the service center 100 via a communication link between the wireless unit 12 and the base station 130. The controller 17 reads and writes data from/to the memory 18 if necessary. The controller 17 communicates with the voice processor 11, the wireless unit 12, the vehicle location detector 13, the emergency call-sending button 14, the emergency call disconnection button 15, and the air bag 20. The air bag 20 sends an inflation signal to the controller 17 when the air bag 20 is inflated due to the traffic accident.

Figure 3:
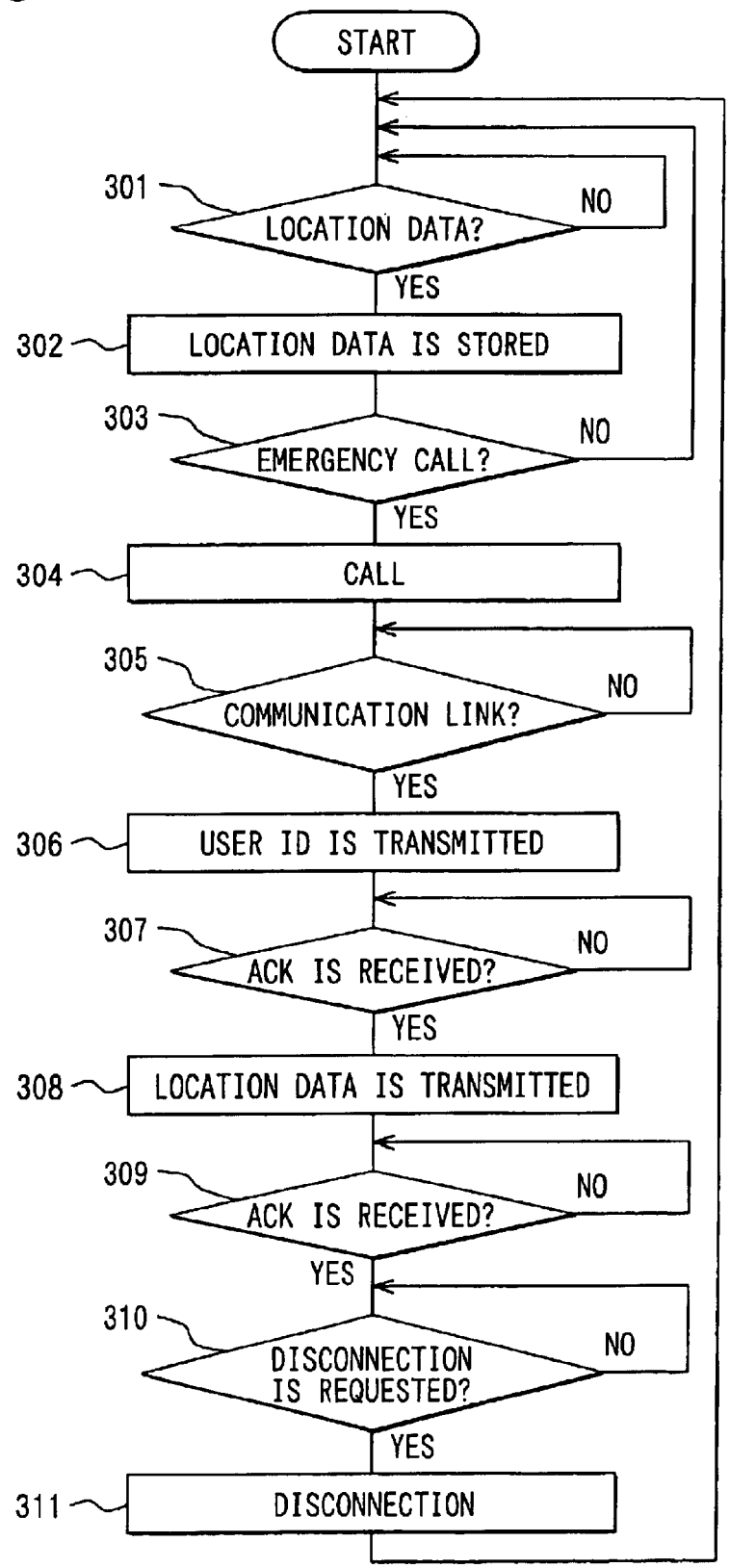
FIG. 3 is a flowchart showing an operation of the emergency call device according to the first embodiment.
Figure 4:
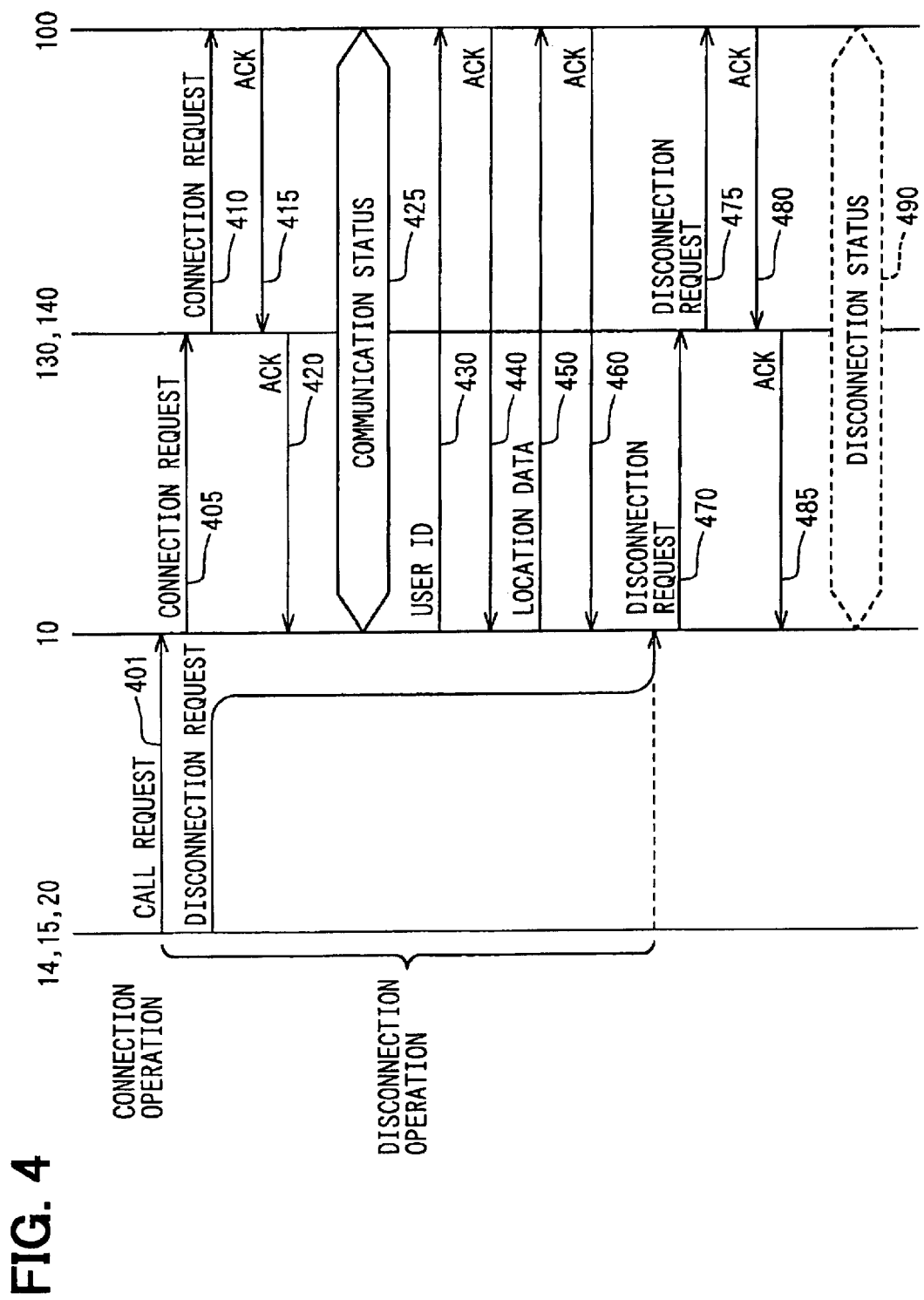
FIG. 4 is a sequence diagram among the emergency call system according to the first embodiment.

FIG. 3 shows a flowchart of the control program, which is read from the ROM to be carried out by the microcomputer of the controller 17. The microcomputer of the controller 17 carries out the control program after the emergency call device 10 is turned on. FIG. 4 is a sequence diagram that shows processes carried out among the emergency call device 10, the base station 130 and the communication network 140, and the service center 100. The sequence diagram of FIG. 4 is achieved by carrying out the control program by the controller 17. Then, operations of the controller 17 will be explained with FIG. 3. Communication among the emergency call device 10, the base station 130 and the communication network 140, and the service center 100 will be explained with reference to FIG. 4.

First, when the emergency call device 10 is turned on, the controller 17 starts processes. As shown in FIG. 3, in step 301, the controller 17 determines whether the current location data is received from the vehicle location detector 13. When the current location data is not received yet, step 301 is repeated until the current location data is received.

When the current location data is received, the process proceeds to step 302. In step 302, the current location data is stored in the RAM of the memory 18.

In next step 303, the controller 17 determines whether a request of originating the emergency call exists or not. In detail, the controller 17 determines that the request of the emergency call exists when the predetermined emergency signal is received or the inflation signal is received. The predetermined emergency signal is received from the emergency call-sending button 14 when the emergency call-sending button 14 is pressed. The inflation signal is received from the air bag 20. On the other hand, the controller 17 determines that the request of originating the emergency call does not exist when the both signals, which are the predetermined emergency signal and the inflation signal, are not received. When the request of the emergency call does not exist, the process returns to step 301.

When the request of the emergency call exists, the process proceeds to step 304. In step 304, the controller 17 sends a call origination signal to the wireless unit 12 to originate the emergency call to the service center 100. Accordingly, as shown in steps 405, 410 of FIG. 4, the emergency call device 10 originates a connection request (call origination) to the service center 100 via the base station 130 and the communication network 140. When the service center 100 receives the connection request signal, the service center 100 sends a first acknowledgement signal of the connection request signal to the emergency call device 10 via the communication network 140 and the base station 130 as shown in steps 415, 420 of FIG. 4.

After the call origination in step 304, the controller 17 determines whether the communication link is established or not in step 305. This is determined based on whether the first acknowledgement signal of the connection request signal is received or not. When the communication link is not established, the process repeats step 305 until the communication link is established. When the communication link is established, the process proceeds to step 306.

When the communication link is established, the emergency call device 10 can communicate with the service center 100 by another process (not shown) as shown in step 425 of FIG. 4. That is, the emergency call device 10 and the service center 100 are in a communication status. In detail, the analog voice signal of the occupant received though the microphone 60 is converted to the digital voice signal by the voice processor 11. The controller 17 receives the digital voice signal, and outputs the digital voice signal as the transmission signal to the wireless unit 12. The wireless unit 12 transmits the uplink signal to the service center 100 after modulating the transmission signal. On the other hand, the downlink signal received by the wireless unit 12 from the service center 100 is inputted into the controller 17. Then, the voice signal that is a part of the downlink signal is inputted into the voice processor 11, so that the voice processor 11 outputs the inputted voice signal to the speaker 50. Therefore, the occupant of the vehicle 1 can talk with the operator of the service center 100 in the communication status.

In step 306, the controller 17 reads the user ID from the ROM of the memory 18. Then, the controller 17 outputs the user ID as the transmission signal to transmit the user ID to the service center 100. Accordingly, the user ID is transmitted to the service center 100 via the base station and the communication network 140 as shown in step 430 of FIG. 4. When the service center 100 receives the user ID from the emergency call device 10, the service center 100 transmits a second acknowledgement signal to the emergency call device 10 via the communication network 140 and the base station 130 as shown in step 440 of FIG. 4.

After the transmission of the user ID in step 306, the controller 17 determines whether the user ID is received in the service center 100 in step 307. This is determined based on whether the second acknowledgement signal is received or not. When the second acknowledgement signal is not received from the service center 100, the process repeats step 307 until the second acknowledgement signal is received in the emergency call device 10. When the second acknowledgement signal is received, the process proceeds to step 308.

In step 308, the controller 17 reads the current location data, which is stored in step 302, from the RAM of the memory 18. Then, the controller 17 outputs the current location data as the transmission signal so that the wireless unit 12 transmits the current location data to the service center 100.

Accordingly, the current location data is transmitted from the emergency call device 10 to the service center 100 via the base station 130 and the communication network 140 as shown in step 450 of FIG. 4. When the service center 100 receives the current location data of the vehicle 1, the service center 100 transmits a third acknowledgement signal to the emergency call device 10 via the communication network 140 and the base station 130 as shown in step 460 of FIG. 4.

After the transmission of the current location data in step 308, the controller 17 determines whether the current location data is received in the service center 100 in step 309. This is determined based on whether the third acknowledgement signal of the current location data is received in the emergency call device 10 or not. When the third acknowledgement signal is not received in the emergency call device 10, the process repeats step 309 until the third acknowledgement signal is received in the emergency call device 10. When the third acknowledgement signal is received, the process proceeds to step 310.

In step 310, the controller 17 determines whether a request of disconnecting the communication link for the emergency call exists or not. In detail, the controller 17 determines whether the predetermined disconnection signal, which indicates that the emergency call disconnection button 15 is pressed, is received from the emergency call disconnection button 15. When the predetermined disconnection signal is not received, the controller 17 repeats step 310 until the predetermined disconnection signal is received. While the process repeats determination process of step 310, the communication status between the occupant of the vehicle 1 and the operator of the service center 100 is continued.

When the predetermined disconnection signal is received from the emergency call disconnection button 15, the process proceeds to step 311. In step 311, the controller 17 carries out a disconnection process that disconnects the communication link between the emergency call device 10 and the service center 100. In detail, the controller 17 outputs a disconnection request signal as the transmission signal to the wireless unit 12. Then, the disconnection request signal is transmitted from the emergency call device 10 to the base station 130 and the communication network 140 as shown in step 470 of FIG. 4. The communication network 140 sends the disconnection request signal to the service center 100 to disconnect the communication link for the emergency call as shown in step 475 of FIG. 4.

Here, the determination of the request for disconnecting the emergency call is delayed until step 310 of FIG. 3 as shown in FIG. 4, even if the emergency call disconnection button 15 is operated between steps 303 and 309 by the occupant, the thief, or the robber.

When the service center 100 receives the disconnection request signal, the service center 100 transmits a fourth acknowledgement signal to the emergency call device 10 via the communication network 140 and the base station 130 as shown in steps 480 and 485. The fourth acknowledgement signal indicates that the service center 100 receives the disconnection signal. After that, the controller 17 terminates the transmission to the service center 100 and the reception from the service center 100, so that the communication link for the emergency call is disconnected. That is, the emergency call device 10 and the service center 100 become in a disconnection status as shown in step 490 of FIG. 4.

In addition, when the communication link is disconnected from the service center 100 while the process is carried out between step 306 and step 310, the process proceeds to step 301.

In the first embodiment, the controller 17 determines whether the disconnection request signal is received or not in step 310, which is carried out only after steps 304 to 309. That is, the determination of receiving the disconnection request is carried out only after originating the emergency call to the service center 100 is carried out and the user ID and the current location data are transmitted to the service center 100. The disconnection request signal is used for disconnecting the communication link between the emergency call device 10 and the service center 100 or terminating the emergency call.

Accordingly, the emergency call can be disconnected from the emergency call device 10 with the press of the emergency call disconnection button 15 by the occupant after recognizable data is transmitted to the service center 100. In other words, the emergency call is prevented from being disconnected before the recognizable data is transmitted to the predetermined emergency call destination. The recognizable data includes the connection request signal in steps 405, 410, the user ID in step 430, and the current location data in step 450. As a result, the service center 100 can recognize the occurrence of the emergency call based on the recognizable data.

In the emergency call device 10 that calls the emergency call to the predetermined emergency call destination when the emergency situation occurs, the emergency call device 10 can transmit the recognizable data to the predetermined emergency call destination even if the disconnection is requested by the operation of the occupant. As a result, the predetermined emergency call destination (service center 100) can recognize the occurrence of the emergency call.

In addition, the controller 17 transmits the user ID, which is the identification data of the sender, in step 306 of FIG. 3. Therefore, the emergency call destination can recognize the sender (emergency call device 10) even if the emergency call is disconnected.

The controller 17 transmits the current location data of the vehicle 1 in step 308 of FIG. 3. Therefore, the emergency call destination can recognize the current location of the sender even if the emergency call is disconnected.

The controller 17 of the emergency call device 10 determines based on the reception of the acknowledgement whether the emergency call destination receives the recognizable data. Therefore, in such an embodiment, the emergency call destination can certainly recognize the occurrence of the emergency call. The reception of the acknowledgement is carried out in steps 440 and 460 of FIG. 4.

In addition, as shown in FIG. 4, even when the disconnection is required before step 460 (step 309 of FIG. 3), the disconnection of the emergency call is delayed until step 470 of FIG. 4 (step 310 of FIG. 3). That is, the disconnection of the emergency call is delayed until the emergency call device 10 receives the acknowledgements in steps 415, 440, and 460. Therefore, the service center 100 can certainly recognize the occurrence of the emergency call even when the robber and thief operate the disconnection button 15 immediately after the emergency call is carried out.

[Second embodiment]

Figure 5:
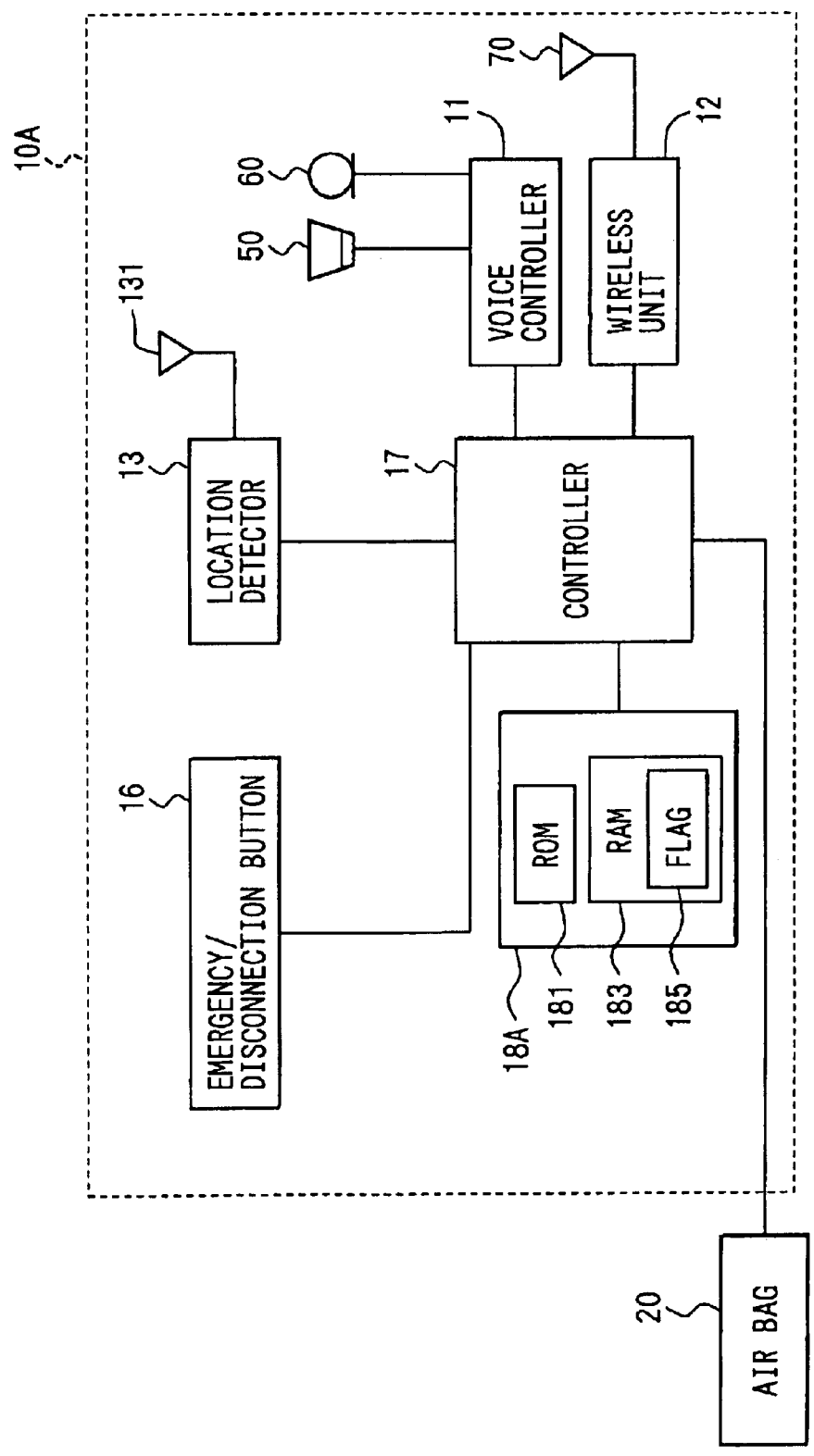
FIG. 5 is a block diagram of another emergency call device according to a second embodiment of the present invention.

Another emergency call device 10A according to the second embodiment of the present invention is shown in FIG. 5. The emergency call device 10A is similar to the emergency call device 10 of the first embodiment. However, the emergency call device 10A has an emergency call sending and disconnection button 16 (emergency/disconnection button) instead of two buttons, which are the emergency call-sending button 14 and the emergency call disconnection button 15 of the first embodiment. The emergency/disconnection button 16 outputs a predetermined signal to the controller 17 when pressed. In addition, a memory 18A includes a ROM 181 and a RAM 183 that has a flag area 185. The flag area 185 stores a connection status flag, which indicates that the emergency call device 10A is in a "connecting or communicating status" or in a "non-communicating status".

When the process of the controller 17 proceeds from step 303 to step 304, the connection status flag in the flag area 185 is turned on to indicate the connecting or communicating status. When the process of the controller 17 returns to step 301, the connection status flag in the flag area 185 is turned off to indicate the non-communicating status. The controller 17 reads the connection status flag every time when the controller 17 receives an input signal from the button 16. The controller 17 determines that the input signal from the button 16 is the request of originating the emergency call when the controller 17 receives the input signal while the status flag is turned off. The controller 17 also determines that the input signal from the button 16 is the request of disconnecting the emergency call when the controller 17 receives the input signal while the status flag is turned on. The other process of the controller 17 of the second embodiment is the same as the first embodiment.

In the second embodiment, the emergency call device 10A has an element as the emergency/disconnection button 16. The element, which is button 16, can alternately indicate connecting or disconnecting between the emergency call device 10A and the emergency call destination (service center 100) by being pressed. Accordingly, the emergency call device 10A can reduce the number of the button as well as the same effect of the first embodiment.

In the first and second embodiments, the process of step 310, which is judged after step 309, corresponds to disconnection request determination means for determining whether the termination of the emergency call is requested or not.

In the first and second embodiments, the process of step 311 corresponds to terminate means for terminating the emergency call based on the determination of the determination means after the recognizable data is provided in the certain call destination.

The present invention should not be limited to the embodiment previously discussed and shown in the figures, but may be implemented in various ways without departing from the spirit of the invention. For example, in the first and second embodiments, the controller 17 determines that the recognizable data is provided in the service center 100 based on the reception of the acknowledgement from the service center 100. However, it is not always necessary to the controller 17. The controller 17 may determine based on another method. For example, it may simply determine based on the transmission of the connection request signal, the user ID, and the current location data.

In the first and second embodiments, the current location data of the vehicle 1 is transmitted to the service center 100. However, another location data may be used instead of the current location data. For example, location data, which indicates fifteen minutes before, may be used as another location data. An estimated position, which is estimated based on a scheduled traveling course or a previous location data, is also used as another location data.

In addition, if the emergency call is requested again before actually disconnecting the communication link after the request of the disconnection, the controller 17 may determine that the disconnection request does not exist in step 310.

What is claimed is:

1. An emergency call device that carries out an emergency call to a certain call destination when an emergency condition occurs, comprising:

a first switch that is operated to carry out the emergency call;

a second switch that is operated to terminate the emergency call; and a controller that controls an origination of the emergency call in response to operation of the first switch and a termination of the emergency call in response to operation of the second switch, wherein the controller includes:

a determination element that determines whether recognizable data in which the certain call destination recognizes an occurrence of the emergency call is transmitted to the certain call destination when the second switch is operated after originating the emergency call in response to the operation of the first switch;

a termination element that terminates the emergency call after the determination element determines that the recognizable data is transmitted; and a delay element that delays the termination of the emergency call until the determination element determines that the recognizable data is transmitted when the determination element does not determine that the recognizable data is transmitted; wherein the request of the termination of the emergency call is determined to not exist if, during the delay of the termination of the emergency call, the emergency call is requested again.

2. The emergency call device according to claim 1, wherein the termination means terminates the emergency call after an identification data of the emergency call device is transmitted to the certain call destination.

3. The emergency call device according to claim 1, wherein the termination means terminates the emergency call after a location data of the emergency call device is transmitted to the certain call destination.

4. The emergency call device according to claim 1, further comprising:

verification means for verifying that the certain call destination receives the recognizable data based on an acknowledgement data of the recognizable data from the certain call destination, wherein the termination means terminates the emergency call after being verified by the verification means.

5. The emergency call device according to claim 1, wherein the determination means determines after receiving an acknowledgement data of the recognizable data from the certain call destination.

6. The emergency call device according to claim 1, wherein the termination of the emergency call is delayed until the emergency call device receives acknowledgement data of the recognizable data from the certain call destination.

7. A method for controlling an emergency call, from an emergency call device, the method comprising:

originating the emergency call to a certain call destination when an emergency condition occurs;

determining whether recognizable data in which the certain call destination recognizes an occurrence of the emergency call is transmitted to the certain call destination when a termination of the emergency call is requested;

terminating the emergency call in response to a request of the termination of the emergency call after determining that the recognizable data is transmitted;

delaying the termination of the emergency call until the recognizable data is transmitted when the termination of the emergency call is requested before transmitting the recognizable data;

determining that the request of the termination of the emergency call does not exist if, during the delay of the termination of the emergency call, the emergency call is requested again.

8. The method according to claim 7, further comprising delaying the termination of the emergency call until the emergency call device receives acknowledgement data of the recognizable data from the certain call destination.

* * * * *